(12) United States Patent
Kitago et al.

(10) Patent No.: US 12,054,614 B2
(45) Date of Patent: Aug. 6, 2024

(54) RUBBER COMPOSITION AND PNEUMATIC TIRE

(71) Applicant: Sumitomo Rubber Industries, Ltd., Hyogo (JP)

(72) Inventors: Ryota Kitago, Kobe (JP); Rie Yasuda, Kobe (JP); Shogo Hirao, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 670 days.

(21) Appl. No.: 17/285,212

(22) PCT Filed: Oct. 15, 2019

(86) PCT No.: PCT/JP2019/040358
§ 371 (c)(1),
(2) Date: Dec. 13, 2021

(87) PCT Pub. No.: WO2020/100494
PCT Pub. Date: May 22, 2020

(65) Prior Publication Data
US 2022/0220287 A1    Jul. 14, 2022

(30) Foreign Application Priority Data

Nov. 12, 2018  (JP) ................... 2018-212212

(51) Int. Cl.
*C08L 9/06* (2006.01)

(52) U.S. Cl.
CPC .......... *C08L 9/06* (2013.01); *C08L 2205/025* (2013.01)

(58) Field of Classification Search
CPC .................. C08L 9/06; C08L 2205/025
See application file for complete search history.

(56) References Cited

U.S. PATENT DOCUMENTS

| | | | |
|---|---|---|---|
| 5,804,644 A | 9/1998 | Nakafutami et al. | |
| 2005/0119399 A1 | 6/2005 | Nishioka et al. | |
| 2006/0167160 A1* | 7/2006 | Nakagawa | B60C 1/0016 524/442 |
| 2011/0136995 A1 | 6/2011 | Nakagawa et al. | |
| 2014/0371383 A1 | 12/2014 | Hayata et al. | |
| 2017/0226233 A1 | 8/2017 | Yamashiro et al. | |
| 2017/0226331 A1 | 8/2017 | Ishino et al. | |
| 2017/0233562 A1 | 8/2017 | Yamada et al. | |
| 2017/0253730 A1 | 9/2017 | Nakajima et al. | |
| 2017/0341468 A1 | 11/2017 | Miyazaki | |
| 2018/0142089 A1 | 5/2018 | Yamashiro | |
| 2019/0062539 A1 | 2/2019 | Adachi et al. | |
| 2019/0264013 A1 | 8/2019 | Hishikawa | |
| 2019/0309146 A1 | 10/2019 | Yokoyama et al. | |
| 2020/0055963 A1 | 2/2020 | Takahashi | |
| 2020/0055964 A1 | 2/2020 | Yamamoto | |

FOREIGN PATENT DOCUMENTS

| | | | |
|---|---|---|---|
| CN | 103764682 | A | 4/2014 |
| CN | 106795335 | A | 5/2017 |
| CN | 107001712 | A | 8/2017 |
| CN | 108084532 | A | 5/2018 |
| EP | 0 659 821 | A1 | 6/1995 |
| EP | 1 514 901 | A1 | 3/2005 |
| EP | 3 181 629 | * | 3/2016 |
| EP | 3623420 | A1 | 3/2020 |
| JP | H07-233286 | A | 9/1995 |
| JP | H09-104205 | A | 4/1997 |
| JP | H10-218920 | A | 8/1998 |
| JP | H11-199711 | A | 7/1999 |
| JP | 2006-291128 | A | 10/2006 |
| JP | 2010-185025 | A | 8/2010 |
| JP | 2012-224835 | A | 11/2012 |
| JP | 2013-177539 | A | 9/2013 |
| JP | 2014-189698 | A | 10/2014 |
| JP | 2016-056351 | A | 4/2016 |
| JP | 2017-145341 | A | 8/2017 |
| JP | 2018-030549 | A | 3/2018 |
| JP | 2018-095776 | A | 6/2018 |
| JP | 2018-145228 | A | 9/2018 |
| JP | 6417064 | B1 | 10/2018 |
| JP | 2019-182982 | A | 10/2019 |
| JP | 2020-079339 | A | 5/2020 |
| WO | 96/05250 | A1 | 2/1996 |
| WO | 2014/156555 | A1 | 10/2014 |
| WO | 2016/039005 | A1 | 3/2016 |
| WO | 2016/039008 | A1 | 3/2016 |
| WO | 2016/104144 | A1 | 6/2016 |
| WO | 2017/150645 | A1 | 9/2017 |
| WO | 2018/110409 | A1 | 6/2018 |
| WO | 2018/110412 | A1 | 6/2018 |
| WO | 2018/110414 | A1 | 6/2018 |

OTHER PUBLICATIONS

International Search Report issued in PCT/JP2019/040358; mailed Dec. 17, 2019.
International Search Report issued in PCT/JP2019/040356; mailed Jan. 7, 2020.
International Search Report issued in PCT/JP2019/040357; mailed Dec. 10, 2019.
International Search Report issued in PCT/JP2019/040359; mailed Jan. 21, 2020.

* cited by examiner

*Primary Examiner* — Doris L Lee

(74) *Attorney, Agent, or Firm* — Studebaker & Brackett PC

(57) ABSTRACT

The purpose is to provide rubber compositions and pneumatic tires which have reduced changes in tan δ over time. The present invention relates to rubber compositions containing at least one copolymer obtained by copolymerizing an aromatic vinyl compound and a conjugated diene compound, the rubber compositions having a heat aging resistance index defined by equation (1) of 2.0 or less.

14 Claims, No Drawings

RUBBER COMPOSITION AND PNEUMATIC TIRE

TECHNICAL FIELD

The present invention relates to rubber compositions and pneumatic tires.

BACKGROUND ART

Exemplary rubber compositions that have been used in automobile tires contain diene rubbers such as polybutadiene or butadiene-styrene copolymers and softeners such as oils.

Moreover, Patent Literature 1 proposes techniques of using hydrogenated styrene-butadiene rubbers to improve properties such as abrasion resistance.

CITATION LIST

Patent Literature

Patent Literature 1: JP H10-218920 A

SUMMARY OF INVENTION

Technical Problem

As a result of extensive investigation, the present inventors have found that the conventional techniques may allow the rubber tan δ to increase during the service of the tire, resulting in a decrease in fuel economy. In other words, it has been found that the conventional techniques leave room for improvement in reducing the change in tan δ over time.

The present invention aims to solve the problem and provide rubber compositions and pneumatic tires which have reduced changes in tan δ over time.

Solution to Problem

The present invention relates to rubber compositions, containing at least one copolymer obtained by copolymerizing an aromatic vinyl compound and a conjugated diene compound,
the rubber compositions having a heat aging resistance index defined by the following equation (1) of 2.0 or less, Heat aging resistance index=[(tan δ of rubber composition after heat treatment)−(tan δ of rubber composition before heat treatment)]/(tan δ of rubber composition before heat treatment)×100    (1)

wherein each tan δ represents the tan δ at 50° C. of the corresponding rubber composition, and the heat treatment involves allowing the rubber composition to stand at a temperature of 90° C. and an oxygen concentration of 20% for 336 hours.

The heat aging resistance index is preferably 1.5 or less, more preferably 1.0 or less, still more preferably 0.5 or less, particularly preferably 0 or less.

Preferably, the rubber compositions further contain at least one softener,
the copolymer is at least one hydrogenated styrene-butadiene rubber having a weight average molecular weight of 200,000 to 2,000,000 and a degree of hydrogenation of 60 mol % or more, and
the rubber compositions have an A value of less than 4.5 as calculated from Hansen solubility parameters (HSPs) of the hydrogenated styrene-butadiene rubber and the softener using the following equation (2):

$$A=\sqrt{(\alpha^2+\beta^2+\gamma^2)} \tag{2}$$

wherein α=absolute value of difference between δd of hydrogenated styrene-butadiene rubber and δd of softener,
β=absolute value of difference between δp of hydrogenated styrene-butadiene rubber and δp of softener,
γ=absolute value of difference between δh of hydrogenated styrene-butadiene rubber and δh of softener,
wherein δd: energy from dispersion forces between molecules,
δp: energy from dipolar intermolecular forces between molecules,
δh: energy from hydrogen bonds between molecules.

An amount of at least one styrene-butadiene rubber is preferably 60% by mass or more based on 100% by mass of at least one rubber component in the rubber compositions.

The rubber compositions preferably contain, per 100 parts by mass of at least one rubber component therein, 50 parts by mass or more of at least one silica.

The rubber compositions preferably contain, per 100 parts by mass of at least one rubber component therein, 70 parts by mass or less of at least one silica.

The rubber compositions preferably contain, per 100 parts by mass of at least one rubber component therein, 30 parts by mass or more of at least one softener.

An amount of at least one carbon black is preferably 3 parts by mass or less per 100 parts by mass of at least one rubber component in the rubber compositions.

The rubber compositions are preferably tread rubber compositions.

The present invention also relates to pneumatic tires, including a tire component at least partially including any of the rubber compositions.

The tire component is preferably a tread.

Advantageous Effects of Invention

The rubber compositions of the present invention contain at least one copolymer obtained by copolymerizing an aromatic vinyl compound and a conjugated diene compound. Further, the rubber compositions have a heat aging resistance index defined as above of 2.0 or less. Such rubber compositions have reduced changes in tan δ over time.

DESCRIPTION OF EMBODIMENTS

The rubber compositions of the present invention are characterized in that the rubber compositions contain at least one copolymer obtained by copolymerizing an aromatic vinyl compound and a conjugated diene compound, and further, the rubber compositions have a heat aging resistance index defined by the equation (1) below of 2.0 or less. Thus, it is possible to reduce the change in tan δ over time, thereby maintaining good tire performance (fuel economy, etc.) for a long time. Herein, the "reduced changes in tan δ over time" means that the increase in tan δ over time is reduced, and does not mean that the decrease in tan δ over time is reduced. This is because a decrease in tan δ over time indicates better tire performance and thus should not be reduced, but rather should be welcome.

Heat aging resistance index=[(tan δ of rubber composition after heat treatment)−(tan δ of rubber composition before heat treatment)]/(tan δ of rubber composition before heat treatment)×100    (1)

wherein each tan δ represents the tan δ at 50° C. of the corresponding rubber composition, and the heat treatment involves allowing the rubber composition to stand at a temperature of 90° C. and an oxygen concentration of 20% for 336 hours.

The rubber compositions have the above-mentioned effect. The reason for this advantageous effect is not exactly clear, but may be explained as follows.

To determine whether or not at least a predetermined level of grip performance can be maintained, it has been conventional to subject a rubber composition to heat treatment at 80° C. for two weeks and then analyze the change in hardness. However, as a result of extensive investigation, the present inventors have found that the test under the above-mentioned heat treatment conditions fails to simulate tires actually in service. As a result of further extensive experimentation on this problem, the inventors have found that heat treatment performed under the conditions specified herein can suitably simulate the state of tires actually in service, thus permitting highly correlated evaluation of the change in tan δ over time.

As a result of still further extensive experimentation, the inventors have found that when a rubber composition shows only a small change in tan δ before and after the heat treatment under the conditions specified herein, the rubber composition has a reduced change in tan δ over time, even after the tire actually runs 50,000 km. More specifically, it has been found that when a rubber composition has a heat aging resistance index of 2.0 or less as calculated using equation (1) with the tan δ values of the rubber composition before and after the heat treatment under the conditions specified herein, the rubber composition has a reduced change in tan δ over time, even after the tire actually runs 50,000 km.

As described, when a rubber composition has a heat aging resistance index of 2.0 or less as calculated using equation (1) with the tan δ values of the rubber composition before and after the heat treatment under the conditions specified herein, the rubber composition has a reduced change in tan δ over time.

Accordingly, the present invention solves the problem (purpose) of reducing the change in tan δ over time by formulating a rubber composition which satisfies the parameter of equation (1). Specifically, the parameter does not define the problem (purpose), and the problem to be solved herein is to reduce the change in tan δ over time. In order to provide a solution to the problem, a rubber composition is formulated to satisfy the parameter of equation (1). In other words, the essential feature is to satisfy the parameter of equation (1).

Herein, the tan δ of the rubber compositions refers to the tan δ of the rubber compositions that have been vulcanized.

The heat treatment is described below.

Herein, the heat treatment involves allowing the (vulcanized) rubber compositions to stand at a temperature of 90° C. and an oxygen concentration of 20% for 336 hours.

For example, the heat treatment may be performed using a thermostatic bath whose temperature and oxygen concentration are controllable. Specifically, the vulcanized rubber compositions may be allowed to stand in a thermostatic bath set at the above-mentioned temperature and oxygen concentration for the above-mentioned period of time.

The method for measuring the tan δ is described below.

Herein, the tan δ of the (vulcanized) rubber compositions refers to the tan δ (loss tangent) determined by viscoelastic measurements at a measurement temperature of 50° C., an initial stain of 10%, a dynamic strain of 2.5%, and a frequency of 10 Hz.

The heat aging resistance index defined by equation (1) is 2.0 or less, preferably 1.8 or less, more preferably 1.7 or less, still more preferably 1.5 or less, particularly preferably 1.0 or less, most preferably 0.6 or less, further preferably 0.5 or less, further preferably 0 or less, further preferably −0.5 or less, further preferably −1.0 or less, further preferably −1.6 or less, further preferably −2.0 or less, further preferably −3.0 or less, further preferably −3.4 or less, further preferably −3.5 or less, further preferably −4.0 or less, further preferably −4.1 or less, further preferably −4.2 or less, further preferably −4.3 or less, further preferably −4.8 or less, further preferably −5.0 or less, further preferably −5.2 or less, further preferably −5.3 or less, further preferably −5.4 or less, further preferably −6.0 or less, further preferably −7.0 or less, further preferably −8.0 or less, further preferably −9.0 or less, further preferably −10.0 or less, further preferably −11.0 or less, further preferably −12.0 or less, further preferably −13.0 or less.

The lower limit of the heat aging resistance index defined by equation (1) is not limited. A lower index is better.

The tan δ of the rubber compositions (vulcanized rubber compositions) before the heat treatment may appropriately vary within a range that satisfies equation (1), and is preferably 0.07 or more, more preferably 0.08 or more, still more preferably 0.09 or more, but is preferably 0.50 or less, more preferably 0.45 or less, still more preferably 0.40 or less, particularly preferably 0.30 or less, most preferably 0.20 or less.

When the tan δ is within the range indicated above, the advantageous effect tends to be more suitably achieved, and the properties such as wet grip performance and fuel economy required of tire rubbers also tend to be suitably achieved.

The rubber compositions (vulcanized rubber compositions) before the heat treatment preferably have a stress at 300% elongation (M300) of 6 MPa or more, more preferably 7 MPa or more, still more preferably 8 MPa or more, but preferably 30 MPa or less, more preferably 25 MPa or less, still more preferably 20 MPa or less, as measured by subjecting No. 3 dumbbell specimens to tensile testing at 23° C. in accordance with JIS K6251(2010).

When the M300 is within the range indicated above, the advantageous effect tends to be more suitably achieved, and the properties such as durability required of tire rubbers also tend to be suitably achieved.

The rubber compositions (vulcanized rubber compositions) before the heat treatment preferably have a tensile strength at break (TB) of 15 MPa or more, more preferably 18 MPa or more, still more preferably 20 MPa or more, but preferably 60 MPa or less, more preferably 50 MPa or less, still more preferably 45 MPa or less, particularly preferably 40 MPa or less, as measured by subjecting No. 3 dumbbell specimens to tensile testing at 23° C. in accordance with JIS K6251(2010).

When the TB is within the range indicated above, the advantageous effect tends to be more suitably achieved, and the properties such as durability required of tire rubbers also tend to be suitably achieved.

The rubber compositions (vulcanized rubber compositions) before the heat treatment preferably have an elongation at break (EB) of 250% or more, more preferably 280% or more, still more preferably 320% or more, but preferably 700% or less, more preferably 650% or less, still more preferably 600% or less, as measured by subjecting No. 3 dumbbell specimens to tensile testing at 23° C. in accordance with JIS K6251(2010).

When the EB is within the range indicated above, the advantageous effect tends to be more suitably achieved, and the properties such as durability required of tire rubbers also tend to be suitably achieved.

The heat aging resistance index (tan δ change) defined by equation (1) of the rubber compositions can be controlled by the types and amounts of the chemicals (in particular, rubber components, fillers, softeners, silane coupling agents) incorporated in the rubber compositions. For example, the tan δ change tends to be reduced by using a rubber component having a few unsaturated bonds, or using a softener highly compatible with rubber components, or using silica as filler, or reducing the amount of softeners, or using a silane coupling agent highly reactive with diene rubbers.

Conventional diene rubbers, which have a lot of unsaturated bonds, will undergo changes in tan δ (hardening) with time due to re-crosslinking. In contrast, rubber components having a few unsaturated bonds will be less likely to undergo re-crosslinking because of the small number of unsaturated bonds and, accordingly, their crosslink density is less likely to be changed by the heat generated during the service of the tire. Thus, the change in tan δ over time can be reduced.

Softeners highly compatible with rubber components are less likely to bloom. This can prevent hardening of the rubber over time.

Silica causes less heat build-up than carbon black. This can reduce the progress of re-crosslinking, thereby reducing the change in tan δ over time.

Moreover, the change in tan δ can also be controlled by varying the amount of sulfur and vulcanization accelerators.

To be more specific, a heat aging resistance index defined by equation (1) of 2.0 or less can be imparted to a vulcanized rubber composition, for example, by selecting appropriate rubber components, softeners, and/or silica as described later, or by appropriately adjusting the amounts thereof. In particular, such properties may be imparted, for example, by using a copolymer that has been subjected to hydrogen addition (hereinafter, also referred to as hydrogenated copolymer) as a rubber component, or by using a hydrogenated copolymer and a softener highly compatible therewith.

Since the hydrogenated copolymer has a few unsaturated bonds, its crosslink density is less likely to be changed by the heat generated during the service of the tire. Thus, the change in tan δ over time can be reduced.

Herein, "hydrogenation" means the same as "hydrogen addition".

The method of using a hydrogenated copolymer and a softener highly compatible therewith is further described below.

For example, when a softener that is compatible with usual SBR is incorporated with a hydrogenated styrene-butadiene rubber (herein, also referred to as hydrogenated SBR), which has a few double bonds, the softener may be incompatible with the hydrogenated SBR and thus bloom. This can allow hardening of the rubber over time to occur easily.

In contrast, when a hydrogenated copolymer is used with a softener highly compatible with the hydrogenated copolymer, the softener is less likely to bloom. This can prevent hardening of the rubber over time. Moreover, the softener highly compatible with the hydrogenated copolymer may be selected on the basis of its Hansen solubility parameters (HSPs). Specifically, it is sufficient to select a softener having HSPs close to those of the hydrogenated copolymer (e.g., hydrogenated SBR). The selected softener is more compatible with the hydrogenated copolymer and thus less likely to bloom. This can prevent hardening of the rubber over time.

More specifically, to allow a vulcanized rubber composition to have a heat aging resistance index defined by equation (1) of 2.0 or less, it is preferred that the rubber composition contain a softener as well as a copolymer obtained by copolymerizing an aromatic vinyl compound and a conjugated diene compound; the copolymer be a hydrogenated styrene-butadiene rubber; and the rubber composition have an A value ($[(J/cm^3)^{1/2}]$) of less than 4.5 as calculated from the Hansen solubility parameters (HSPs) of the hydrogenated styrene-butadiene rubber and the softener using the equation (2) below. The copolymer is preferably a hydrogenated styrene-butadiene rubber having a weight average molecular weight of 200,000 to 2,000,000 and a degree of hydrogenation of 60 mol % or more.

The A value is more preferably 4.0 or less, still more preferably 3.5 or less, particularly preferably 3.1 or less, most preferably 2.6 or less, still most preferably 2.1 or less, further most preferably 1.9 or less. The lower limit is not limited and is preferably as close to 0 as possible. It may be 0.

With the A value indicated above, the heat aging resistance index defined by equation (1) can be suitably adjusted to 2.0 or less.

When multiple rubber components or softeners are present, the component which is present in the largest amount is used to calculate the A value.

$$A=\sqrt{(\alpha^2+\beta^2+\gamma^2)} \quad (2)$$

wherein α=absolute value of difference between δd of hydrogenated styrene-butadiene rubber and δd of softener ($[(J/cm^3)^{1/2}]$), β=absolute value of difference between δp of hydrogenated styrene-butadiene rubber and δp of softener ($[(J/cm^3)^{1/2}]$), γ=absolute value of difference between δh of hydrogenated styrene-butadiene rubber and δh of softener ($[(J/cm^3)^{1/2}]$), wherein δd: energy from dispersion forces between molecules ($[(J/cm^3)^{1/2}]$), δp: energy from dipolar intermolecular forces between molecules ($[(J/cm^3)^{1/2}]$), δh: energy from hydrogen bonds between molecules ($[(J/cm^3)^{1/2}]$).

Herein, the Hansen solubility parameters δd, δp, and δh refer to the values at 298.15 K and 101.3 kPa determined by the Hansen solubility sphere method.

As described, in the method of using a hydrogenated copolymer and a softener highly compatible therewith, it is important to use a softener highly compatible with the hydrogenated copolymer. Examples of the softener include oils, liquid polymers (liquid diene polymers), and resins as described later. The amount of the softener depends on the type of softener used.

In the case of a softener having unsaturated bonds that are cross-linkable with the rubber components, specifically a liquid diene polymer, the amount thereof is not limited.

Conversely, in the case of a softener not having unsaturated bonds that are cross-linkable with the rubber components, specifically a resin, the amount thereof is preferably 20 parts by mass or less per 100 parts by mass of the rubber components.

Other techniques for adjusting the heat aging resistance index defined by equation (1) to 2.0 or less include reducing the amount of softeners, or using a silane coupling agent highly reactive with diene rubbers.

The tan δ, M300, TB, and EB of the rubber compositions can be controlled by the types and amounts of the chemicals (in particular, rubber components, fillers) incorporated in the rubber compositions. For example, the M300, TB, and EB tend to be increased by increasing the amount of fillers or reducing the amount of softeners, while the M300, TB, and EB tend to be decreased by reducing the amount of fillers or increasing the amount of softeners. For example, the tan δ tends to be increased by increasing the amount of fillers or the amount of softeners, while the tan δ tends to be decreased by reducing the amount of fillers or the amount of softeners.

Examples of techniques for imparting the tan δ, M300, TB, and EB values indicated above include the techniques for adjusting the heat aging resistance index defined by equation (1) to 2.0 or less, as well as varying the type and amount of the filler used.

Chemicals that may be used are described below.

The rubber compositions contain at least one rubber component (hereinafter rubber components) including at least one copolymer obtained by copolymerizing an aromatic vinyl compound and a conjugated diene compound (hereinafter, also referred to as the copolymer of an aromatic vinyl compound and a conjugated diene compound). The at least one copolymer may be a single copolymer or a combination of two or more copolymers.

Since, as described earlier, the change in tan δ over time can be easily reduced by using a hydrogenated copolymer, the following description centers on embodiments in which the copolymer is a hydrogenated copolymer. It is to be noted, however, that the use of unhydrogenated copolymers as the copolymer is not excluded.

The term "rubber components" preferably refer to rubbers having a weight average molecular weight (Mw) of 150,000 or more, more preferably 350,000 or more. The upper limit of the Mw is not limited and is preferably 4,000,000 or less, more preferably 3,000,000 or less.

The rubber components preferably include at least one hydrogenated copolymer obtained by hydrogenating the conjugated diene portion of the copolymer of an aromatic vinyl compound and a conjugated diene compound.

The hydrogenated copolymer, in which the number of double bonds has been reduced by hydrogenation, has a small number of reaction points for re-crosslinking. Thus, the change in tan δ over time can be reduced.

Examples of the aromatic vinyl compound include styrene, α-methylstyrene, 1-vinylnaphthalene, 3-vinyltoluene, ethylvinylbenzene, divinylbenzene, 4-cyclohexylstyrene, and 2,4,6-trimethylstyrene. These may be used alone or in combinations of two or more. Among these, styrene is particularly preferred in view of practical aspects such as availability of monomers and because the advantageous effect can be more suitably achieved.

Examples of the conjugated diene compound include 1,3-butadiene, isoprene, 1,3-pentadiene, 2,3-dimethylbutadiene, 2-phenyl-1,3-butadiene, and 1,3-hexadiene. These may be used alone or in combinations of two or more. Among these, 1,3-butadiene or isoprene is preferred, with 1,3-butadiene being more preferred, in view of practical aspects such as availability of monomers and because the advantageous effect can be more suitably achieved.

The copolymer of an aromatic vinyl compound and a conjugated diene compound is preferably a copolymer of styrene and 1,3-butadiene (styrene-butadiene copolymer (SBR)). Therefore, the copolymer is preferably a styrene-butadiene copolymer, more preferably a hydrogenated styrene-butadiene copolymer.

The styrene-butadiene copolymer may be produced by copolymerizing styrene and 1,3-butadiene in any order. The copolymerization may be random copolymerization or block copolymerization, preferably random copolymerization. The same applies to aromatic vinyl compound/conjugated diene compound copolymers other than the styrene-butadiene copolymer.

The degree of hydrogenation of the copolymer (the degree of hydrogenation of the conjugated diene portion of the copolymer of an aromatic vinyl compound and a conjugated diene compound) is preferably 60 mol % or more, more preferably 75 mol % or more, still more preferably 80 mol % or more, particularly preferably 90 mol % or more, most preferably 93 mol % or more. The degree of hydrogenation of the copolymer is also preferably 99 mol % or less, more preferably 98% mol % or less. When the degree of hydrogenation is within the range indicated above, the advantageous effect tends to be more suitably achieved.

The degree of hydrogenation may be calculated from the rate of decrease in the unsaturated bond signals in the $^1$H-NMR spectrum.

The copolymer preferably has a weight average molecular weight (Mw) of 200,000 or more, more preferably 400,000 or more. The Mw of the copolymer is also preferably 2,000,000 or less, more preferably 1,000,000 or less, still more preferably 800,000 or less, particularly preferably 600,000 or less. When the Mw is within the range indicated above, the advantageous effect tends to be more suitably achieved.

Herein, the weight average molecular weight (Mw) and number average molecular weight (Mn) may be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

The copolymer preferably has a glass transition temperature (Tg) of −45° C. or higher, more preferably −35° C. or higher, still more preferably −30° C. or higher, further more preferably −25° C. or higher, particularly preferably −24.5° C. or higher, most preferably −24° C. or higher. The Tg of the copolymer is also preferably lower than −10° C., more preferably lower than −12.5° C., still more preferably lower than −13° C., further more preferably lower than −15° C., particularly preferably lower than −17.5° C., most preferably lower than −20° C. When the Tg is within the range indicated above, the advantageous effect tends to be more suitably achieved.

The glass transition temperature (Tg) of the copolymer is measured as described later in EXAMPLES.

In the case where the copolymer is a styrene-butadiene copolymer, the styrene content of the styrene-butadiene copolymer is preferably 5% by mass or higher, more preferably 10% by mass or higher, still more preferably 15% by mass or higher, particularly preferably 20% by mass or higher, most preferably 25% by mass or higher. The styrene content of the styrene-butadiene copolymer is also preferably 40% by mass or lower, more preferably 35% by mass or lower. When the styrene content is within the range indicated above, the advantageous effect tends to be more suitably achieved.

The styrene content is determined as described later in EXAMPLES.

The copolymer may be an unmodified copolymer or a modified copolymer.

The modified copolymer may be any copolymer having a functional group interactive with a filler such as silica. For example, it may be a chain end-modified copolymer obtained by modifying at least one chain end of a copolymer with a compound (modifier) having the functional group (a chain end-modified copolymer terminated with the functional group); a backbone-modified copolymer having the functional group in the backbone; a backbone- and chain end-modified copolymer having the functional group in both the backbone and chain end (for example, a backbone- and chain end-modified copolymer in which the backbone has the functional group and at least one chain end is modified with the modifier); or a chain end-modified copolymer that has been modified (coupled) with a polyfunctional compound having two or more epoxy groups in the molecule so that a hydroxy or epoxy group is introduced.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxy, oxy, and epoxy groups. These functional groups may be substituted. Among these, amino (preferably amino whose hydrogen atom is replaced with a C1-C6 alkyl group), alkoxy (preferably C1-C6 alkoxy), alkoxysilyl (preferably C1-C6 alkoxysilyl) groups are preferred.

The copolymer may be synthesized, for example, by polymerizing an aromatic vinyl compound and a conjugated diene compound, and specifically as described below.

Moreover, the hydrogenated copolymer may be synthesized, for example, by polymerizing an aromatic vinyl compound and a conjugated diene compound to obtain a polymer, and then hydrogenating the polymer, and specifically as described below.

<Method for Producing Copolymer>
(Polymerization Method)

The copolymer of an aromatic vinyl compound and a conjugated diene compound may be produced by any polymerization method, including solution polymerization, vapor phase polymerization, and bulk polymerization, particularly preferably by solution polymerization. Moreover, the polymerization may be carried out either in a batch mode or in a continuous mode.

For solution polymerization, the monomer concentration (the combined amount of styrene and 1,3-butadine in the case of a styrene-butadiene copolymer) in the solvent is preferably 5% by mass or more, more preferably 10% by mass or more. The monomer concentration in the solvent is also preferably 50% by mass or less, more preferably 30% by mass or less.

(Polymerization Initiator for Anionic Polymerization)

For anionic polymerization, any polymerization initiator may be used, but organic lithium compounds are preferred. Examples of the organic lithium compounds include those containing C2-C20 alkyl groups, such as ethyllithium, n-propyllithium, isopropyllithium, n-butyllithium, sec-butyllithium, tert-butyllithium, tert-octyllithium, n-decyllithium, phenyllithium, 2-naphthyllithium, 2-butylphenyllithium, 4-phenylbutyllithium, cyclohexyllithium, cyclopentyllithium, and reaction products of diisopropenylbenzene and butyllithium. From the standpoints of availability, safety, and other aspects, n-butyllithium or sec-butyllithium is preferred among these.

Moreover, the polymerization reaction may be carried out in the presence of a compound (R) prepared by mixing at least one of the organic lithium compounds mentioned above with a compound (B1) containing a functional group interactive with silica. By performing the polymerization in the presence of the compound (R), the functional group interactive with silica can be introduced to the polymerization initiating terminal of the copolymer. The copolymer thus obtained has a modified initiation terminal. The term "interactive" herein means that a covalent bond or an intermolecular force weaker than the covalent bond (e.g., an electromagnetic force between molecules such as an ion-dipole interaction, dipole-dipole interaction, hydrogen bond, or van der Waals force) can be formed between the molecules. The term "functional group interactive with silica" refers to a group having at least one atom interactive with silica, such as nitrogen, sulfur, phosphorus, or oxygen atom.

In particular, the compound (R) is preferably a reaction product of an organic lithium compound and a nitrogen-containing compound such as a secondary amine compound. Specific examples of the nitrogen-containing compound include dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallylamine, morpholine, N-(trimethylsilyl)piperazine, N-(tert-butyldimethylsilyl)piperazine, and 1,3-ditrimethylsilyl-1,3,5-triazinane. The polymerization in the presence of the compound (R) may be carried out by preliminarily mixing an organic lithium compound with a compound (B1) to prepare a compound (R) and adding the compound (R) to the polymerization system, followed by polymerization. Alternatively, it may be carried out by adding an organic lithium compound and a compound (B1) to the polymerization system and mixing them in the polymerization system to prepare a compound (R), followed by polymerization.

(Method for Anionic Polymerization)

The production of the copolymer through anionic polymerization using the polymerization initiator may be carried out by any conventional method.

Specifically, monomers such as styrene and 1,3-butadiene may be anionically polymerized in an organic solvent inert to the reaction, for example, a hydrocarbon solvent such as an aliphatic, alicyclic, or aromatic hydrocarbon compound using a polymerization initiator such as butyllithium, optionally in the presence of a randomizer to produce a target copolymer such as a styrene-butadiene copolymer.

(Hydrocarbon Solvent for Anionic Polymerization)

The hydrocarbon solvent is preferably a C3-C8 hydrocarbon solvent, and examples include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, and ethylbenzene. These may be used alone or in admixtures of two or more.

(Randomizer for Anionic Polymerization)

The randomizer refers to a compound that has the function of controlling the microstructure of the conjugated diene portion of a copolymer, for example, increase of 1,2-butadiene units or 3,4-isoprene units, or the function of controlling the compositional distribution of monomer units in a copolymer, for example, randomization of styrene and butadiene units in a styrene-butadiene copolymer. The randomizer is not limited, and any known compound commonly and conventionally used as a randomizer may be used. Examples include ethers and tertiary amines, such as dimethoxybenzene, tetrahydrofuran, dimethoxyethane, diethylene glycol dibutyl ether, diethylene glycol dimethyl ether, bistetrahydrofurylpropane, triethylamine, pyridine, N-methylmorpholine, N,N,N',N'-tetramethylethylenediamine, and 1,2-dipiperidinoethane. Other examples include potassium salts such as potassium-t-amylate and potassium-t-butoxide, and sodium salts such as sodium-t-amylate. These randomizers may be used alone or in combinations of two or more. The amount of the randomizer used per mol of the organic lithium compound is preferably 0.01 mole equivalents or more, more preferably 0.05 mole equivalents or more. The amount of the randomizer per mol of the organic lithium compound is also preferably 1000 mole equivalents or less, more preferably 500 mole equivalents or less.

The Tg of the copolymer may be controlled by varying the type and amount of the randomizer used. For example, the Tg of the copolymer may be lowered by reducing the amount of tetrahydrofuran.

(Reaction Temperature)

The anionic polymerization may be carried out at any reaction temperature at which the reaction suitably proceeds. Usually, the reaction temperature is preferably −10° C. to 100° C., more preferably 25° C. to 70° C.

(Termination of Reaction)

The anionic polymerization may be terminated by addition of a reaction terminator usually used in this field. Examples of such reaction terminators include polar solvents containing active protons such as acetic acid and alcohols (e.g., methanol, ethanol, isopropanol), and mixtures of the foregoing. Other examples include mixtures of the foregoing polar solvents and non-polar solvents such as hexane or cyclohexane. It is usually sufficient that the amount of the reaction terminator added be about equal to or twice the molar amount of the initiator for anionic polymerization.

Moreover, modification may also be performed by known techniques.

<Coupling>

In the method for producing the copolymer, a coupling agent may be added to the hydrocarbon solution of the copolymer at any time from the initiation of the polymerization of monomers until the polymer is recovered as described later. The coupling agent may be a compound represented by the following formula (3-1):

$$R^1_a ML_{4-a} \quad (3-1)$$

wherein $R^1$ represents an alkyl group, an alkenyl group, a cycloalkenyl group, or an aryl group; M represents a silicon atom or a tin atom; L represents a halogen atom or a hydrocarbyloxy group; and a represents an integer of 0 to 2.

Examples of the coupling agent of formula (3-1) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

To enhance the processability of the polymer, the amount of the coupling agent added is preferably 0.03 mol or more, more preferably 0.05 mol or more, per mol of the alkali metal derived from the alkali metal catalyst. Moreover, to enhance fuel economy, the amount is preferably 0.4 mol or less, more preferably 0.3 mol or less.

<Hydrogenation Method>

In the production of a hydrogenated copolymer, the above-described copolymer may be hydrogenated to obtain a hydrogenated copolymer.

The hydrogenation may be carried out by any method under any reaction conditions, including known methods and conditions. Usually, the hydrogenation is carried out at 20 to 150° C. under 0.1 to 10 MPa hydrogen pressure in the presence of a hydrogenation catalyst. The degree of hydrogenation may be set as desired by changing, for example, the amount of the hydrogenation catalyst, the hydrogen pressure during the hydrogenation reaction, or the duration of the reaction. The hydrogenation catalyst used may usually be a compound containing any of the metals of groups 4 to 11 of the periodic table. For example, compounds containing any of the atoms: Ti, V, Co, Ni, Zr, Ru, Rh, Pd, Hf, Re, and Pt can be used as hydrogenation catalysts. More specific examples of the hydrogenation catalysts include metallocene compounds containing Ti, Zr, Hf, Co, Ni, Pd, Pt, Ru, Rh, Re, or other metals; supported heterogeneous catalysts in which a metal such as Pd, Ni, Pt, Rh, or Ru is supported on a carrier such as carbon, silica, alumina, or diatomaceous earth; homogeneous Ziegler catalysts in which an organic salt or acetylacetone salt of a metal element such as Ni or Co is combined with a reducing agent such as an organoaluminum; organometallic compounds or complexes containing Ru, Rh, or other metals; and fullerenes and carbon nanotubes in which hydrogen is stored.

Among these, metallocene compounds containing Ti, Zr, Hf, Co, or Ni are preferred because they allow the hydrogenation reaction to be carried out in a homogeneous system in an inert organic solvent. More preferred are metallocene compounds containing Ti, Zr, or Hf. In particular, hydrogenation catalysts obtained by reaction of titanocene compounds and alkyllithiums are preferred because such catalysts are inexpensive and industrially very useful. Specific examples include hydrogenation catalysts described in, for example, JP H1-275605 A, JP H5-271326 A, JP H5-271325 A, JP H5-222115 A, JP H11-292924 A, JP 2000-37632 A, JP S59-133203 A, JP S63-5401 A, JP S62-218403 A, JP H7-90017 A, JP S43-19960 B, and JP S47-40473 B. These hydrogenation catalysts may be used alone or in combinations of two or more.

The amount of the copolymers (preferably hydrogenated copolymers) based on 100% by mass of the rubber components is preferably 60% by mass or more, more preferably 70% by mass or more, still more preferably 80% by mass or more, particularly preferably 90% by mass or more, most preferably 100% by mass. When the amount is within the range indicated above, the advantageous effect tends to be more suitably achieved.

The amount of the styrene-butadiene rubbers (preferably hydrogenated styrene-butadiene rubbers) based on 100% by mass of the rubber components is preferably 60% by mass or more, more preferably 70% by mass or more, still more preferably 80% by mass or more, particularly preferably 90% by mass or more, most preferably 100% by mass. When the amount is within the range indicated above, the advantageous effect tends to be more suitably achieved.

Preferably, the rubber compositions contain at least one styrene-butadiene rubber (preferably, hydrogenated styrene-butadiene rubber) in an amount of 60% by mass or more based on 100% by mass of the rubber components, and also contain at least one silica in an amount of 50 parts by mass or more, but preferably not more than 70 parts by mass, per 100 parts by mass of the rubber components. Moreover, the rubber compositions preferably contain 30 parts by mass of more of at least one softener per 100 parts by mass of the rubber components. Moreover, the amount of at least one carbon black is preferably 3 parts by mass or less per 100 parts by mass of the rubber components.

Examples of additional rubber components that may be used in addition to the above-described copolymer include diene rubbers such as polybutadiene rubbers (BR), isoprene-based rubbers, acrylonitrile-butadiene rubbers (NBR), chloroprene rubbers (CR), and butyl rubbers (IIR). These rubber components may be used alone or in combinations of two or more.

Any BR commonly used in the tire industry may be used. These may be used alone or in combinations of two or more.

The BR may be commercially available from Ube Industries, Ltd., JSR Corporation, Asahi Kasei Corporation, Zeon Corporation, etc.

Examples of the isoprene-based rubbers include natural rubbers (NR), polyisoprene rubbers (IR), refined NR, modified NR, and modified IR. The NR may be one commonly used in the tire industry such as SIR20, RSS #3, or TSR20. Non-limiting examples of the IR include those commonly used in the tire industry such as IR2200. Examples of the refined NR include deproteinized natural rubbers (DPNR) and highly purified natural rubbers (UPNR). Examples of the modified NR include epoxidized natural rubbers (ENR), hydrogenated natural rubbers (HNR), and grafted natural rubbers. Examples of the modified IR include epoxidized polyisoprene rubbers, hydrogenated polyisoprene rubbers, and grafted polyisoprene rubbers. These may be used alone or in combinations of two or more.

The rubber compositions may contain at least one silica.

Examples of the silica include dry silica (silicic anhydride) and wet silica (hydrous silicic acid). Wet silica is preferred because it contains a large number of silanol groups. These may be used alone or in combinations of two or more.

The nitrogen adsorption specific surface area ($N_2SA$) of the silica is 40 $m^2/g$ or more, preferably 60 $m^2/g$ or more, more preferably 80 $m^2/g$ or more, still more preferably 160 $m^2/g$ or more. The $N_2SA$ is also preferably 600 $m^2/g$ or less, more preferably 300 $m^2/g$ or less, still more preferably 250 $m^2/g$ or less, particularly preferably 200 $m^2/g$ or less. When the $N_2SA$ is within the range indicated above, the advantageous effect tends to be more suitably achieved.

The $N_2SA$ of the silica is determined by the BET method in accordance with ASTM D3037-81.

The silica may be commercially available from Degussa, Rhodia, Tosoh Silica Corporation, Solvay Japan, Tokuyama Corporation, etc.

The amount of the silica per 100 parts by mass of the rubber components is preferably 30 parts by mass or more, more preferably 40 parts by mass or more, still more preferably 50 parts by mass or more, particularly preferably 55 parts by mass or more, but is preferably 150 parts by mass or less, more preferably 100 parts by mass or less, still more preferably 80 parts by mass or less, particularly preferably 70 parts by mass or less. When the amount is within the range indicated above, the advantageous effect tends to be better achieved.

The amount of the silica based on 100% by mass of the fillers (reinforcing fillers) in the rubber compositions is preferably 60% by mass or more, more preferably 70% by mass or more, still more preferably 80% by mass or more, particularly preferably 90% by mass or more, most preferably 100% by mass. When the amount is within the range indicated above, the advantageous effect tends to be more suitably achieved.

The rubber compositions containing the silica preferably further contain at least one silane coupling agent.

Any silane coupling agent may be used, and examples include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane and 2-mercaptoethyltriethoxysilane; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. Commercial products available from Degussa, Momentive, Shin-Etsu Silicone, Tokyo Chemical Industry Co., Ltd., AZmax. Co., Dow Corning Toray Co., Ltd., etc. may be used. These may be used alone or in combinations of two or more. Among these, sulfide and mercapto silane coupling agents are preferred because the advantageous effect tends to be better achieved. More preferred are disulfide silane coupling agents having disulfide bonds such as bis(3-triethoxysilylpropyl)disulfide.

The amount of the silane coupling agents per 100 parts by mass of the silica is preferably 3 parts by mass or more, more preferably 5 parts by mass or more, but is preferably 20 parts by mass or less, more preferably 15 parts by mass or less. When the amount is within the range indicated above, the advantageous effect tends to be better achieved.

The rubber compositions may contain at least one carbon black.

Non-limiting examples of the carbon black include N134, N110, N220, N234, N219, N339, N330, N326, N351, N550, and N762. These may be used alone or in combinations of two or more.

The nitrogen adsorption specific surface area ($N_2SA$) of the carbon black is preferably 80 $m^2/g$ or more, more preferably 100 $m^2/g$ or more, but is preferably 150 $m^2/g$ or less, more preferably 130 $m^2/g$ or less. When the $N_2SA$ is within the range indicated above, the advantageous effect tends to be better achieved.

Herein, the $N_2SA$ of the carbon black is measured in accordance with JIS K6217-2:2001.

The carbon black may be commercially available from Asahi Carbon Co., Ltd., Cabot Japan K.K., Tokai Carbon Co., Ltd., Mitsubishi Chemical Corporation, Lion Corporation, NSCC Carbon Co., Ltd., Columbia Carbon, etc.

The incorporation of carbon black may increase heat build-up, possibly accelerating the progress of re-crosslinking. Thus, the amount of the carbon black per 100 parts by mass of the rubber components is preferably 10 parts by mass or less, more preferably 3 parts by mass or less, still more preferably 1 part by mass or less, particularly preferably 0 parts by mass. When the amount is within the range indicated above, the advantageous effect tends to be more suitably achieved.

The rubber compositions preferably contain at least one softener. Any softener may be used. Examples include oils, liquid polymers (liquid diene polymers), and resins. These softeners may be used alone or in combinations of two or more.

Preferred among the softeners is at least one selected from the group consisting of oils, liquid polymers, and resins. More preferred are liquid polymers and/or resins, with combinations of liquid polymers and resins being still more preferred.

Any oil may be used. Examples include conventional oils, including process oils such as paraffinic process oils, aromatic process oils, and naphthenic process oils, low PCA (polycyclic aromatic) process oils such as TDAE and MES, vegetable oils, and mixtures thereof. These may be used alone or in combinations of two or more. Aromatic process oils are preferred among these. Specific examples of the aromatic process oils include Diana process oil AH series available from Idemitsu Kosan Co., Ltd.

The oils may be commercially available from Idemitsu Kosan Co., Ltd., Sankyo Yuka Kogyo K.K., Japan Energy Corporation, Olisoy, H&R, Hokoku Corporation, Showa Shell Sekiyu K.K., Fuji Kosan Co., Ltd., etc.

The liquid polymers (liquid diene polymers) refer to diene polymers that are liquid at room temperature (25° C.)

The liquid diene polymers preferably have a polystyrene equivalent weight average molecular weight (Mw) of $1.0 \times 10^3$ or more, more preferably $3.0 \times 10^3$ or more, still more preferably $5.0 \times 10^3$ or more, particularly preferably $1.0 \times 10^4$ or more, most preferably $2.0 \times 10^4$ or more, but preferably $2.0 \times 10^5$ or less, more preferably $1.0 \times 10^5$ or less, still more preferably $5.0 \times 10^4$ or less, particularly preferably $3.5 \times 10^4$ or less, as measured by gel permeation chromatography (GPC). When the Mw is within the range indicated above, the advantageous effect tends to be more suitably achieved.

Examples of the liquid diene polymers include (co)polymers of at least one selected from the group consisting of butadiene, isoprene, styrene, farnesene, and derivatives thereof. These (co)polymers may be used alone or in combinations of two or more. Exemplary such liquid diene polymers include liquid styrene-butadiene copolymers (liquid SBR), liquid polybutadiene polymers (liquid BR), liquid polyisoprene polymers (liquid IR), and liquid styrene-isoprene copolymers (liquid SIR). Among these, liquid SBR and liquid IR are preferred, with liquid IR being more preferred.

Moreover, the liquid diene polymers may be hydrogenated.

The liquid polymers may be commercially available from CRAY VALLEY, Kuraray Co., Ltd., etc.

Any resin may be used. Examples include coumarone resins, styrene resins, terpene resins, dicyclopentadiene resins (DCPD resins), C5 petroleum resins, C9 petroleum resins, C5C9 petroleum resins, p-t-butylphenol acetylene resins, and acrylic resins. These may be used alone or in combinations of two or more.

The resins may be hydrogenated.

In particular, preferred are resins which are highly compatible with the hydrogenated copolymer used, specifically resins which have HSPs close to those of the hydrogenated SBR, more specifically resins which have an A value calculated by equation (2) of less than 4.5, i.e., terpene resins.

The terpene resins may be any resin having units derived from a terpene compound. Examples include polyterpenes (resins produced by polymerization of terpene compounds), terpene aromatic resins (resins produced by copolymerization of terpene compounds and aromatic compounds), and aromatic modified terpene resins (resins obtained by modification of terpene resins with aromatic compounds). These may be used alone or in combinations of two or more. Polyterpenes are preferred among these.

The terpene compounds refer to hydrocarbons having a composition represented by $(C_5H_8)_n$ or oxygen-containing derivatives thereof, each of which has a terpene backbone and is classified as, for example, a monoterpene $(C_{10}H_{16})$, sesquiterpene $(C_{15}H_{24})$, or diterpene $(C_{20}H_{32})$. Examples of the terpene compounds include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol. Other examples of the terpene compounds include resin acids (rosin acids) such as abietic acid, neoabietic acid, palustric acid, levopimaric acid, pimaric acid, and isopimaric acid. In other words, the terpene resins also include rosin resins mainly containing rosin acids produced by processing pine resin. Examples of the rosin resins include natural rosin resins (polymerized rosins) such as gum rosins, wood rosins, and tall oil rosins; modified rosin resins such as maleic acid-modified rosin resins and rosin-modified phenol resins; rosin esters such as rosin glycerol esters; and disproportionated rosin resins obtained by disproportionation of rosin resins.

The aromatic compounds may be any compound having an aromatic ring. Examples include phenol compounds such as phenol, alkylphenols, alkoxyphenols, and unsaturated hydrocarbon group-containing phenols; naphthol compounds such as naphthol, alkylnaphthols, alkoxynaphthols, and unsaturated hydrocarbon group-containing naphthols; styrene and styrene derivatives such as alkylstyrenes, alkoxystyrenes, and unsaturated hydrocarbon group-containing styrenes. Styrene is preferred among these.

The softening point of the resins is preferably −30° C. or higher, more preferably 30° C. or higher, still more preferably 60° C. or higher, particularly preferably 80° C. or higher, most preferably 100° C. or higher. The softening point is also preferably 200° C. or lower, more preferably 160° C. or lower. When the softening point is within the range indicated above, the advantageous effect tends to be more suitably achieved.

The softening point of the resins is determined in accordance with JIS K 6220-1:2001 using a ring and ball softening point measuring apparatus and defined as the temperature at which the ball drops down.

The resins may be commercially available from Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JXTG Nippon Oil & Energy Corporation, Arakawa Chemical Industries, Ltd., Taoka Chemical Co., Ltd., etc.

The amount of the softeners per 100 parts by mass of the rubber components is preferably 5 parts by mass or more, more preferably 10 parts by mass or more, still more preferably 20 parts by mass or more, particularly preferably 30 parts by mass or more. The amount is also preferably 60 parts by mass or less, more preferably 50 parts by mass or less, still more preferably 45 parts by mass or less. When the amount is within the range indicated above, the advantageous effect tends to be more suitably achieved.

The amount of the softeners includes the amount of the oils contained in the rubbers (oil extended rubbers), if used.

The amount of the liquid polymers (liquid diene polymers) is not limited, but is preferably 5 parts by mass or more, more preferably 10 parts by mass or more, still more preferably 20 parts by mass or more. The amount is also preferably 60 parts by mass or less, more preferably 55 parts by mass or less, still more preferably 50 parts by mass or less, particularly preferably 45 parts by mass or less. When the amount is within the range indicated above, the advantageous effect tends to be more suitably achieved.

The amount of the resins is preferably 5 parts by mass or more, more preferably 8 parts by mass or more. The amount is also preferably 20 parts by mass or less, more preferably 15 parts by mass or less, still more preferably 10 parts by mass or less. When the amount is within the range indicated above, the advantageous effect tends to be more suitably achieved.

Since the oils are more likely to bloom and can allow hardening of the rubber over time to occur easily, the amount of the oils is preferably 5 parts by mass or less, more preferably 3 parts by mass or less, still more preferably 1 part by mass or less, particularly preferably 0 parts by mass. When the amount is within the range indicated above, the advantageous effect tends to be more suitably achieved.

The rubber compositions may contain at least one wax.

Non-limiting examples of the waxes include petroleum waxes such as paraffin waxes and microcrystalline waxes; naturally-occurring waxes such as plant waxes and animal waxes; and synthetic waxes such as polymers of ethylene, propylene, or other similar monomers. These may be used alone or in combinations of two or more. Among these, petroleum waxes are preferred, and paraffin waxes are more preferred.

The waxes may be commercially available from Ouchi Shinko Chemical Industrial Co., Ltd., Nippon Seiro Co., Ltd., Seiko Chemical Co., Ltd., etc.

The amount of the waxes per 100 parts by mass of the rubber components is preferably 0.3 parts by mass or more, more preferably 0.5 parts by mass or more, but is preferably 20 parts by mass or less, more preferably 10 parts by mass or less. When the amount is within the range indicated above, the advantageous effect tends to be better achieved.

The rubber compositions may contain at least one antioxidant.

Examples of the antioxidants include naphthylamine antioxidants such as phenyl-α-naphthylamine; diphenylamine antioxidants such as octylated diphenylamine and 4,4'-bis (α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis [methylene-3-(3',5'-di-t-butyl-4'-hydroxyphenyl)propionate]methane. These may be used alone or in combinations of two or more. Among these, p-phenylenediamine and/or quinoline antioxidants are preferred.

The antioxidants may be commercially available from Seiko Chemical Co., Ltd., Sumitomo Chemical Co., Ltd., Ouchi Shinko Chemical Industrial Co., Ltd., Flexsys, etc.

The amount of the antioxidants per 100 parts by mass of the rubber components is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber compositions may contain at least one stearic acid.

The stearic acid may be a conventional one, e.g., available from NOF Corporation, Kao Corporation, FUJIFILM Wako Pure Chemical Corporation, or Chiba Fatty Acid Co., Ltd.

The amount of the stearic acid per 100 parts by mass of the rubber components is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber compositions may contain at least one zinc oxide.

The zinc oxide may be a conventional one, e.g., available from Mitsui Mining & Smelting Co., Ltd., Toho Zinc Co., Ltd., HakusuiTech Co., Ltd., Seido Chemical Industry Co., Ltd., or Sakai Chemical Industry Co., Ltd.

The amount of the zinc oxide per 100 parts by mass of the rubber components is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber compositions may contain at least one sulfur.

Examples of the sulfur include those commonly used in the rubber industry, such as powdered sulfur, precipitated sulfur, colloidal sulfur, insoluble sulfur, highly dispersible sulfur, and soluble sulfur. These may be used alone or in combinations of two or more.

The sulfur may be commercially available from Tsurumi Chemical Industry Co., Ltd., Karuizawa sulfur Co., Ltd., Shikoku Chemicals Corporation, Flexsys, Nippon Kanryu Industry Co., Ltd., Hosoi Chemical Industry Co., Ltd., etc.

The amount of the sulfur per 100 parts by mass of the rubber components is preferably 0.1 parts by mass or more, more preferably 0.5 parts by mass or more, but is preferably 10 parts by mass or less, more preferably 5 parts by mass or less, still more preferably 3 parts by mass or less. When the amount is within the range indicated above, the advantageous effect tends to be better achieved.

The rubber compositions may contain at least one vulcanization accelerator.

Any vulcanization accelerator may be used. Examples include guanidine vulcanization accelerators, sulfenamide vulcanization accelerators, thiazole vulcanization accelerators, thiuram vulcanization accelerators, dithiocarbamate vulcanization accelerators, thiourea vulcanization accelerators, and xanthate vulcanization accelerators. These may be used alone or in combinations of two or more. To better achieve the advantageous effect, guanidine, sulfenamide, thiazole, and thiuram vulcanization accelerators are preferred among these.

Examples of the guanidine vulcanization accelerators include 1,3-diphenylguanidine, 1,3-di-o-tolylguanidine, 1-o-tolylbiguanide, a di-o-tolylguanidine salt of dicatechol borate, 1,3-di-o-cumenylguanidine, 1,3-di-o-biphenylguanidine, and 1,3-di-o-cumenyl-2-propionylguanidine. These may be used alone or in combinations of two or more. Preferred among these is 1,3-diphenylguanidine or 1,3-di-o-tolylguanidine.

Examples of the sulfenamide vulcanization accelerators include N-cyclohexyl-2-benzothiazolylsulfenamide, N,N-dicyclohexyl-2-benzothiazolylsulfenamide, N-tert-butyl-2- benzothiazolylsulfenamide, N-oxydiethylene-2-benzothiazolylsulfenamide, and N-methyl-2-benzothiazolylsulfenamide. These may be used alone or in combinations of two or more. Preferred among these is N-cyclohexyl-2-benzothiazolylsulfenamide.

Examples of the thiazole vulcanization accelerators include 2-mercaptobenzothiazole (MBT), dibenzothiazyl disulfide (MBTS), 2-(2,4-dinitrophenyl)mercaptobenzothiazole, and 2-(2,6-diethyl-4-morpholinothio)benzothiazole. These may be used alone or in combinations of two or more. Preferred among these is 2-mercaptobenzothiazole or dibenzothiazyl disulfide.

Examples of the thiuram vulcanization accelerators include tetrakis(2-ethylhexyl)thiuram disulfide, tetrabenzylthiuram disulfide, tetramethylthiuram disulfide, tetraethylthiuram disulfide, and dipentamethylenethiuram tetrasulfide. These may be used alone or in combinations of two or more. Preferred among these is tetrakis(2-ethylhexyl)thiuram disulfide or tetrabenzylthiuram disulfide.

The vulcanization accelerators may be commercially available from Kawaguchi Chemical Industry Co., Ltd., Ouchi Shinko Chemical Industrial Co., Ltd., Sanshin Chemical Industry Co., Ltd., etc.

The amount of the vulcanization accelerators per 100 parts by mass of the rubber components is preferably 1 part by mass or more, more preferably 2 parts by mass or more, but is preferably 10 parts by mass or less, more preferably 7 parts by mass or less, still more preferably 5 parts by mass or less. When the amount is within the range indicated above, the advantageous effect tends to be better achieved.

In addition to the above-mentioned components, the rubber compositions may further contain additives commonly used in the tire industry, such as organic peroxides, and fillers such as calcium carbonate, talc, alumina, clay, aluminum hydroxide, and mica. The amount of each of such additives is preferably 0.1 to 200 parts by mass per 100 parts by mass of the rubber components.

The rubber compositions may be prepared, for example, by kneading the components using a rubber kneading machine such as an open roll mill or a Banbury mixer, and then vulcanizing the kneaded mixture.

The kneading conditions are as follows: in a base kneading step of kneading additives other than vulcanizing agents and vulcanization accelerators, the kneading temperature is usually 100 to 180° C., preferably 120 to 170° C., while in a final kneading step of kneading vulcanizing agents and vulcanization accelerators, the kneading temperature is usually 120° C. or lower, preferably 80 to 110° C. The composition after kneading vulcanizing agents and vulcanization accelerators is usually vulcanized by press vulcanization, for example. The vulcanization temperature is usually 140 to 190° C., preferably 150 to 185° C. The vulcanization time is usually 5 to 15 minutes.

The rubber compositions may be used in tire components (i.e., as tire rubber compositions), including, for example, treads (cap treads), sidewalls, base treads, undertreads, clinches, bead apexes, breaker cushion rubbers, rubbers for carcass cord topping, insulations, chafers, and innerliners, and side reinforcement layers of run-flat tires. The rubber compositions are suitable for use in treads, among others.

The pneumatic tires of the present invention can be produced from the above-described rubber compositions by usual methods. Specifically, an unvulcanized rubber composition containing additives as needed may be extruded into the shape of a tire component (in particular, a tread (cap tread)) and then formed and assembled with other tire components in a tire building machine in a usual manner to build an unvulcanized tire, which may then be heated and pressurized in a vulcanizer to produce a tire.

It is sufficient that the tire component (e.g., tread) of the pneumatic tires at least partially include any of the rubber compositions. The entire tire component may include any of the rubber compositions.

The pneumatic tires are suitable for use as tires for passenger vehicles, large passenger vehicles, large SUVs, trucks and buses, or two-wheeled vehicles, racing tires, studless winter tires, run-flat tires, aircraft tires, mining tires, or other tires.

EXAMPLES

The present invention is specifically described with reference to, but not limited to, examples below.

The chemicals used in the synthesis and polymerization processes are listed below. The chemicals were purified as needed by conventional techniques.

n-Hexane: a product of Kanto Chemical Co., Inc.
Styrene: a product of Kanto Chemical Co., Inc.
Butadiene: 1,3-butadiene available from Tokyo Chemical Industry Co., Ltd.
TMEDA: N,N,N',Nf-tetramethylethylenediamine available from Kanto Chemical Co., Inc.
n-Butyllithium solution: 1.6 M solution of n-butyllithium in hexane available from Kanto Chemical Co., Inc.
Ethanol: a product of Kanto Chemical Co., Inc.
2,6-Di-tert-butyl-p-cresol: Nocrac 200 available from Ouchi Shinko Chemical Industrial Co., Ltd.

The methods for evaluating the prepared copolymers are collectively described below.
(Measurement of Degree of Hydrogenation of Conjugated Diene Portion of Copolymer)

A solution having a concentration of 15% by mass was prepared using carbon tetrachloride as a solvent and used to measure a $H^1$-NMR spectrum at 100 MHz. The degree of hydrogenation was calculated from the rate of decrease in the unsaturated bond signals in the $H^1$-NMR spectrum.
(Measurement of Styrene Content)

A $^1$H-NMR spectrum was measured using a JEOL JNM-A 400 NMR device at 25° C. The ratio of the phenyl protons of the styrene unit at 6.5 to 7.2 ppm to the vinyl protons of the butadiene unit at 4.9 to 5.4 ppm was calculated from the spectrum and used to determine the styrene content.
(Measurement of Weight Average Molecular Weight (Mw) and Number Average Molecular Weight (Mn))

The weight average molecular weight (Mw) and number average molecular weight (Mn) of each copolymer were determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.
(Measurement of Glass Transition Temperature (Tg))

The glass transition temperature (Tg) was defined as the glass transition onset temperature measured using a differential scanning calorimeter (Q200, TA Instruments, Japan) at a temperature increase rate of 10° C./min in accordance with JIS K 7121.

Copolymer Production Examples

Synthesis Example 1 (Synthesis of SBR 1, Degree of Hydrogenation (Hereinafter DH): 0 Mol %)

A sufficiently nitrogen-purged heat-resistant reaction vessel was charged with 2000 mL of n-hexane, 60 g of styrene, 140 g of butadiene, 0.93 g of TMEDA, and 0.45 mmol of n-butyllithium, followed by stirring at 50° C. for five hours to perform a polymerization reaction. Thereafter, the reaction was terminated by addition of ethanol, and 1 g of 2,6-di-tert-butyl-p-cresol was added to the reaction solution, followed by purification by reprecipitation to give SBR 1. The SBR 1 had a weight average molecular weight (Mw) of 490,000 and a styrene content of 30% by mass.

Synthesis Example 2 (Synthesis of Hydrogenated SBR 1, DH: 95 Mol %)

Hydrogenated SBR 1 was prepared in the same manner as described for SBR 1, except that the obtained polymer was hydrogenated. Specifically, after the polymerization conversion reaction of SBR 1, the polymerization reaction was not terminated by addition of ethanol. Instead, the reaction solution was then stirred for 20 minutes while supplying hydrogen gas at a pressure of 0.4 MPa gauge to react the unreacted polymer terminal lithium with hydrogen into lithium hydride. Hydrogenation was performed using a titanocene dichloride-based catalyst at a hydrogen gas supply pressure of 0.7 MPa gauge and a reaction temperature of 90° C. Once the cumulative amount of absorbed hydrogen reached the amount corresponding to the target degree of hydrogenation, the reaction temperature was brought to room temperature, and the hydrogen pressure was returned to an ordinary pressure. Then, the reaction solution was drawn from the reaction vessel and introduced into water with stirring. The solvent was removed by steam stripping to give hydrogenated SBR 1. The hydrogenated SBR 1 had a degree of hydrogenation of 95 mol % and a weight average molecular weight (Mw) of 450,000.

Synthesis Example 3 (Synthesis of Hydrogenated SBR 2, DH: 80 Mol %)

Hydrogenated SBR 2 was prepared in the same manner as described for hydrogenated SBR 1, except that the cumulative amount of absorbed hydrogen was adjusted so as to correspond to the target degree of hydrogenation. The hydrogenated SBR 2 had a degree of hydrogenation of 80 mol % and a weight average molecular weight (Mw) of 480,000.

Synthesis Example 4 (Synthesis of Hydrogenated SBR 3, DH: 60 Mol %)

Hydrogenated SBR 3 was prepared in the same manner as described for hydrogenated SBR 1, except that the cumulative amount of absorbed hydrogen was adjusted so as to correspond to the target degree of hydrogenation. The hydrogenated SBR 3 had a degree of hydrogenation of 60 mol % and a weight average molecular weight (Mw) of 450,000.

TABLE 1

|  | SBR 1 | Hydrogenated SBR 1 | Hydrogenated SBR 2 | Hydrogenated SBR 3 |
| --- | --- | --- | --- | --- |
| Degree of hydrogenation (mol %) | 0 | 95 | 80 | 60 |
| Styrene content (% by mass) | 30 | 30 | 30 | 30 |
| Butadiene content (% by mass) | 70 | 70 | 70 | 70 |
| Weight average molecular weight (Mw) | 490,000 | 450,000 | 480,000 | 450,000 |
| Mw/Mn | 1.18 | 1.19 | 1.22 | 1.18 |
| Glass transition temperature (Tg, ° C.) | −30 | −31 | −30 | −30 |

The chemicals used in the examples and comparative examples are listed below.

SBR 1: Unhydrogenated SBR synthesized as described above

Hydrogenated SBRs 1 to 3: Hydrogenated SBRs synthesized as described above

Silica 1: VN3 ($N_2SA$: 175 $m^2/g$) available from Evonik Degussa

Silica 2: 115GR ($N_2SA$: 115 $m^2/g$) available from Solvay Japan

Silica 3: 9000GR ($N_2SA$: 235 $m^2/g$) available from Evonik Degussa

Softener 1: Diana process AH-24 (aromatic oil) available from Idemitsu Kosan Co., Ltd.

Softener 2: PS-32 (mineral oil) available from Idemitsu Kosan Co., Ltd.

Softener 3: SYLVARES SA85 (α-methylstyrene resin (copolymer of α-methylstyrene and styrene), softening point: 85° C.) available from Arizona chemical Softener 4: NOVARES C100 (coumarone-indene resin, softening point: 95 to 105° C.) available from Rutgers Chemicals Softener 5: Kuraprene LIR30 (liquid IR, weight average molecular weight: 29000) available from Kuraray Co., Ltd.

Softener 6: Sylvatraxx 4150 (polyterpene resin, softening point: 150° C.) available from KRATON Softener 7: RICON 100 (liquid SBR, styrene content: 20% by mass, vinyl content: 70% by mass, weight average molecular weight: 4500) available from Sartomer Softener 8: Dercolyte L120 (polylimonene resin, softening point: 120° C.) available from DRT Silane coupling agent 1: Si266 (bis(3-triethoxysilyl-propyl)disulfide) available from Evonik Degussa Silane coupling agent 2: Si69 (bis(3-triethoxysilyl-propyl)tetrasulfide) available from Evonik Degussa Silane coupling agent 3: Si363 (3-[ethoxybis(3,6,9,12,15-pentaoxaoctacosan-1-yloxy)silyl]-1-propanethiol, a compound represented by the following formula) available from Evonik Degussa

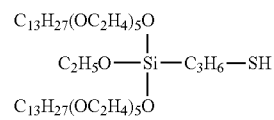

Antioxidant: Nocrac 6C (N-(1,3-dimethylbutyl)-N'-phenyl-p-phenylenediamine) available from Ouchi Shinko Chemical Industrial Co., Ltd.

Stearic acid: stearic acid beads "TSUBAKI" available from NOF Corporation
Zinc oxide: zinc oxide #3 available from HakusuiTech Co., Ltd.
Wax: Ozoace 0355 available from Nippon Seiro Co., Ltd.
Sulfur: powdered sulfur available from Tsurumi Chemical Industry Co., Ltd.
Vulcanization accelerator 1: vulcanization accelerator: NOCCELER CZ (N-cyclohexyl-2-benzothiazolylsulfenamide) available from Ouchi Shinko Chemical Industrial Co., Ltd.
Vulcanization accelerator 2: SANCELER TBZTD (tetrabenzylthiuram disulfide) available from Sanshin Chemical Industry Co., Ltd.
Vulcanization accelerator 3: NOCCELER DT (1,3-di-o-tolylguanidine) available from Ouchi Shinko Chemical Industrial Co., Ltd.
Vulcanization accelerator 4: NOCCELER M-P (2-mercaptobenzothiazole) available from Ouchi Shinko Chemical Industrial Co., Ltd.
Vulcanization accelerator 5: NOCCELER TOT-N (tetrakis(2-ethylhexyl)thiuram disulfide) available from Ouchi Shinko Chemical Industrial Co., Ltd.
Vulcanization accelerator 6: NOCCELER D (1,3-diphenylguanidine) available from Ouchi Shinko Chemical Industrial Co., Ltd.

EXAMPLES AND COMPARATIVE EXAMPLES

According to the formulation shown in Table 2, the chemicals other than the sulfur and vulcanization accelerators were kneaded for five minutes at 150° C. using a 1.7 L Banbury mixer (Kobe Steel, Ltd.) to give a kneaded mixture. Next, the sulfur and vulcanization accelerators were added to the kneaded mixture, followed by kneading for five minutes at 80° C. using an open roll mill to obtain an unvulcanized rubber composition.

The unvulcanized rubber composition was press-vulcanized for 10 minutes at 170° C. to obtain a vulcanized rubber composition.

Separately, the unvulcanized rubber composition prepared as above was formed into the shape of a cap tread and assembled with other tire components to build an unvulcanized tire. The unvulcanized tire was press-vulcanized at 170° C. for 10 minutes to prepare a test tire (size: 195/65R15).

(Heat Treatment)

Moreover, the vulcanized rubber composition was subjected to heat treatment by allowing it to stand in an oven at a temperature of 90° C. and an oxygen concentration of 20% for 336 hours. Thus, a heat-treated vulcanized rubber composition was prepared.

The vulcanized rubber compositions, heat-treated vulcanized rubber compositions, and test tires prepared as above were evaluated as described below. Table 2 shows the results.

(Tan δ)

The tan δ of the vulcanized rubber compositions (specimens) and heat-treated vulcanized rubber compositions (specimens) was measured using a viscoelastic spectrometer (VES, Iwamoto Seisakusho Co., Ltd.) at a measurement temperature of 50° C., an initial stain of 10%, a dynamic strain of 2.5%, and a frequency of 10 Hz.

Five test tires of the same formulation were prepared. Four out of the five test tires were mounted on each wheel of a vehicle (a front-engine, front-wheel-drive vehicle of 2000 cc displacement made in Japan), and the vehicle was run 50,000 km. Then, specimens were cut out from the treads of the test tires after 50,000 km running and the unused test tire. The tan δ of the respective specimens was measured as described above. Then, a tan δ change before and after running was calculated according to the equation below. A smaller tan δ change before and after running indicates less change in tan δ over time.

tan δ change before and after running=[(tan δ of specimen cut out from test tire after 50,000 km running)−(tan δ of specimen cut out from unused test tire)]/(tan δ of specimen cut out from unused test tire)×100

(Tensile Testing)

In accordance with JIS K6251(2010), No. 3 dumbbell specimens were prepared from the vulcanized rubber compositions. The specimens were subjected to tensile testing at 23° C. to determine the stress at 300% elongation (M300), tensile strength at break (TB), and elongation at break (EB).

TABLE 2

| | | Comp. Ex. 1 | Comp. Ex. 2 | Comp. Ex. 3 | Comp. Ex. 4 | Comp. Ex. 5 | Ex. 1 | Ex. 2 | Ex. 3 | Ex. 4 | Ex. 5 | Ex. 6 |
|---|---|---|---|---|---|---|---|---|---|---|---|---|
| Formulation (parts by mass) | SBR1 | 100 | | | | | | | | | | |
| | Hydrogenated SBR 1 | | 100 | 100 | 100 | 100 | 100 | 100 | 100 | 100 | 100 | 100 |
| | Hydrogenated SBR 2 | | | | | | | | | | | |
| | Hydrogenated SBR 3 | | | | | | | | | | | |
| | Silica 1 | 60 | 60 | 60 | 60 | 60 | 60 | 60 | 60 | 60 | 60 | 60 |
| | Silica 2 | | | | | | | | | | | |
| | Silica 3 | | | | | | | | | | | |
| | Softener 1 | 35 | | | | | | | | | | |
| | Softener 2 | | 35 | | | | | | | | | |
| | Softener 3 | | | 35 | | | | | | | | |
| | Softener 4 | | | | 35 | | | | | | | |
| | Softener 5 | | | | | 35 | | | | | | |
| | Softener 6 | | | | | | 35 | 15 | 25 | 25 | 25 | 25 |
| | Softener 7 | | | | | | | 20 | 10 | 10 | 10 | 10 |
| | Softener 8 | | | | | | | | | | | |
| | Silane coupling agent 1 | 5 | 5 | 5 | 5 | 5 | 5 | 5 | 5 | 5 | 5 | 5 |
| | Silane coupling agent 2 | | | | | | | | | | | |
| | Silane coupling agent 3 | | | | | | | | | | | |
| | Antioxidant | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 |
| | Sulfur | 1.5 | 1 | 1 | 1 | 1 | 1.5 | 1 | 2 | 3 | 0.8 | 2 |
| | Vulcanization accelerator 1 | 2 | 2 | 2 | 2 | 2 | 2 | 2 | 2 | 2 | 1.5 | 2 |
| | Vulcanization accelerator 2 | | 1 | 1 | 1 | 1 | 2 | 1 | 1 | 1 | 1 | 0.5 |
| | Vulcanization accelerator 3 | | | | | | | | | | | |
| | Vulcanization accelerator 4 | | | | | | | | | | | |
| | Vulcanization accelerator 5 | | | | | | | | | | | |
| | Vulcanization accelerator 6 | | 1 | 1 | 1 | 1 | 1 | 1 | 1 | 1 | 0.5 | 0.5 |
| Evaluation | tan δ before heat treatment | 0.118 | 0.135 | 0.095 | 0.258 | 0.170 | 0.100 | 0.230 | 0.169 | 0.149 | 0.138 | 0.114 |
| | tan δ after heat treatment | 0.121 | 0.139 | 0.097 | 0.266 | 0.181 | 0.087 | 0.234 | 0.162 | 0.141 | 0.132 | 0.110 |
| | Heat aging resistance index | 2.5 | 3.0 | 2.1 | 3.1 | 6.5 | −13.0 | 1.7 | −4.1 | −5.4 | −4.3 | −3.5 |
| | tan δ before tire running | 0.110 | 0.130 | 0.087 | 0.253 | 0.168 | 0.098 | 0.225 | 0.161 | 0.147 | 0.133 | 0.112 |
| | tan δ after tire running | 0.115 | 0.136 | 0.091 | 0.270 | 0.185 | 0.087 | 0.229 | 0.152 | 0.138 | 0.127 | 0.108 |
| | tan δ change before and after running | 4.5 | 4.6 | 4.6 | 6.7 | 10.1 | −11.2 | 1.8 | −5.6 | −6.1 | −4.5 | −3.6 |
| | α [(J/cm³)$^{1/2}$] | — | 0.46 | 0.56 | 0.35 | 3.04 | 0.45 | 1.00 | 0.45 | 0.45 | 0.45 | 0.45 |
| | β [(J/cm³)$^{1/2}$] | — | 4.13 | 4.30 | 5.96 | 6.93 | 1.22 | 1.58 | 1.22 | 1.22 | 1.22 | 1.22 |
| | γ [(J/cm³)$^{1/2}$] | — | 1.85 | 1.85 | 2.03 | 2.24 | 1.61 | 0.27 | 1.61 | 1.61 | 1.61 | 1.61 |
| | A [(J/cm³)$^{1/2}$] | — | 4.55 | 4.71 | 6.31 | 7.89 | 2.07 | 1.89 | 2.07 | 2.07 | 2.07 | 2.07 |
| | HSP of softener | Aromatic oil | Aromatic oil | Mineral oil | SA85 | NOVARES C100 | Kuraprene LIR | Sylvatraxx 4150 | Kuraprene LIR | Kuraprene LIR | Kuraprene LIR | Kuraprene LIR |

TABLE 2-continued

| | Ex. 7 | Ex. 8 | Ex. 9 | Ex. 10 | Ex. 11 | Ex. 12 | Ex. 13 | Ex. 14 | Ex. 15 | Ex. 16 | Comp. Ex. 6 |
|---|---|---|---|---|---|---|---|---|---|---|---|
| δd [J/cm³]^(1/2) | | 18.65 | 18.75 | 17.84 | 21.23 | 18.64 | 17.19 | 18.64 | 18.64 | 18.64 | 18.64 |
| δp [J/cm³]^(1/2) | | 4.51 | 4.68 | 6.34 | 7.31 | 1.60 | 1.96 | 1.60 | 1.60 | 1.60 | 1.60 |
| δh [J/cm³]^(1/2) | | 0.90 | 0.90 | 4.78 | 4.99 | 1.14 | 3.02 | 1.14 | 1.14 | 1.14 | 1.14 |
| HSP of polymer | | DH 95% | DH 95% | DH 95% | DH 95% | DH 95% | DH 95% | DH 95% | DH 95% | DH 95% | DH 95% |
| δd [J/cm³]^(1/2) | | 18.19 | 18.19 | 18.19 | 18.19 | 18.19 | 18.19 | 18.19 | 18.19 | 18.19 | 18.19 |
| δp [J/cm³]^(1/2) | | 0.38 | 0.38 | 0.38 | 0.38 | 0.38 | 0.38 | 0.38 | 0.38 | 0.38 | 0.38 |
| δh [J/cm³]^(1/2) | | 2.75 | 2.75 | 2.75 | 2.75 | 2.75 | 2.75 | 2.75 | 2.75 | 2.75 | 2.75 |
| Other properties | | | | | | | | | | | |
| M300 [MPa] | 6.7 | 10.4 | 10.1 | 13.0 | 12.5 | 8.2 | 17.9 | 21.3 | 24.7 | 20.1 | 16.6 |
| TB [MPa] | 18.5 | 29.2 | 26.1 | 31.6 | 28.5 | 17.7 | 35.1 | 37.9 | 38.7 | 36.9 | 37.6 |
| EB [%] | 580 | 559 | 522 | 544 | 565 | 484 | 484 | 424 | 364 | 464 | 506 |

| Formulation (parts by mass) | Ex. 7 | Ex. 8 | Ex. 9 | Ex. 10 | Ex. 11 | Ex. 12 | Ex. 13 | Ex. 14 | Ex. 15 | Ex. 16 | Comp. Ex. 6 |
|---|---|---|---|---|---|---|---|---|---|---|---|
| SBR1 | 100 | 100 | 100 | 100 | 100 | | | | | | |
| Hydrogenated SBR 1 | | | | | | 100 | 100 | 100 | 100 | | |
| Hydrogenated SBR 2 | | | | | | | | | | 100 | |
| Hydrogenated SBR 3 | | | | | | | | | | | 100 |
| Silica 1 | 60 | 60 | 60 | | | 60 | 60 | 60 | 60 | 60 | 60 |
| Silica 2 | | | | 70 | | | | | | | |
| Silica 3 | | | | | 50 | | | | | | |
| Softener 1 | | | | | | | | | | | |
| Softener 2 | | | | | | | | | | | |
| Softener 3 | | | | | | | | | | | |
| Softener 4 | | | | | | | | | | | |
| Softener 5 | 25 | 25 | 25 | 25 | 25 | 25 | 25 | 0 | 0 | 0 | 0 |
| Softener 6 | 10 | 10 | 10 | 10 | 10 | 10 | 10 | 10 | 10 | 10 | 0 |
| Softener 7 | | | | | | | | 25 | 25 | 25 | 35 |
| Softener 8 | | | | | | | | | | | |
| Silane coupling agent 1 | 5 | 5 | 5 | 5 | 5 | 5 | 5 | 5 | 5 | 5 | 5 |
| Silane coupling agent 2 | | | | | | | | | | | |
| Silane coupling agent 3 | | | | | | | | | | | |
| Antioxidant | 1.5 | 1.5 | 1.5 | 1.5 | 1.5 | 1.5 | 1.5 | 1.5 | 1.5 | 1.5 | 1.5 |
| Stearic acid | 2 | 2 | 2 | 2 | 2 | 2 | 2 | 2 | 2 | 2 | 2 |
| Zinc oxide | 2.5 | 2.5 | 2.5 | 2.5 | 2.5 | 2.5 | 2.5 | 2.5 | 2.5 | 2.5 | 2.5 |
| Wax | 1 | 1 | 1 | 1 | 1 | 1 | 1 | 1 | 1 | 1 | 1 |
| Sulfur | 1 | 1 | 1 | 1 | 1 | 1 | 1 | 3 | 3 | 3 | 3 |
| Vulcanization accelerator 1 | 2 | 2 | 2 | 2 | 2 | 2 | 2 | 2 | 2 | 2 | 2 |
| Vulcanization accelerator 2 | 1 | 1 | 1 | 1 | 1 | 1 | 1 | 1 | 1 | 1 | 1 |
| Vulcanization accelerator 3 | | | | | | | | | | | |
| Vulcanization accelerator 4 | | 1 | | | | | | | | | |
| Vulcanization accelerator 5 | | | 1 | | | | | | | | |
| Vulcanization accelerator 6 | 0.5 | 0.5 | 0.5 | 0.5 | 0.5 | 0.5 | 0.5 | 0.5 | 0.5 | 0.5 | 0.5 |

TABLE 2-continued

| Evaluation | | | | | | | | | | | |
|---|---|---|---|---|---|---|---|---|---|---|---|
| | tan δ before heat treatment | 0.187 | 0.194 | 0.189 | 0.203 | 0.168 | 0.187 | 0.186 | 0.165 | 0.164 | 0.165 | 0.327 |
| | tan δ after heat treatment | 0.178 | 0.184 | 0.179 | 0.196 | 0.161 | 0.184 | 0.185 | 0.168 | 0.165 | 0.166 | 0.373 |
| | Heat aging resistance index | −4.8 | −5.2 | −5.3 | −3.4 | −4.2 | −1.6 | −0.5 | 1.8 | 0.6 | 0.6 | 14.1 |
| | tan δ before tire running | 0.179 | 0.192 | 0.184 | 0.195 | 0.166 | 0.179 | 0.181 | 0.157 | 0.159 | 0.157 | 0.325 |
| | tan δ after tire running | 0.170 | 0.183 | 0.177 | 0.187 | 0.159 | 0.176 | 0.181 | 0.160 | 0.161 | 0.158 | 0.384 |
| | tan δ change before and after running | −5.0 | −4.7 | −3.8 | −4.1 | −4.2 | −1.7 | 0.0 | 1.9 | 1.3 | 0.6 | 18.2 |
| | α [(J/cm³)$^{1/2}$] | 0.45 | 0.45 | 0.45 | 0.45 | 0.45 | 0.30 | 0.27 | 0.904 | 0.874 | 0.724 | 0.947 |
| | β [(J/cm³)$^{1/2}$] | 1.22 | 1.22 | 1.22 | 1.22 | 1.22 | 1.31 | 1.95 | 0.546 | 2.714 | 2.624 | 1.566 |
| | Y [(J/cm³)$^{1/2}$] | 1.61 | 1.61 | 1.61 | 1.61 | 1.61 | 1.61 | 2.35 | 0.024 | 0.764 | 0.764 | 3.299 |
| | A [(J/cm³)$^{1/2}$] | 2.07 | 2.07 | 2.07 | 2.07 | 2.07 | 2.10 | 3.07 | 1.06 | 2.95 | 2.83 | 3.77 |
| | HSP of softener | Kuraprene LIR | Kuraprene LIR | Kuraprene LIR | Kuraprene LIR | Kuraprene LIR | Kuraprene LIR | Kuraprene LIR | RICON 100 | RICON 100 | RICON 100 | L120 |
| | δd [(J/cm³)$^{1/2}$] | 18.64 | 18.64 | 18.64 | 18.64 | 18.64 | 18.64 | 18.64 | 17.466 | 17.466 | 17.466 | 19.317 |
| | δp [(J/cm³)$^{1/2}$] | 1.60 | 1.60 | 1.60 | 1.60 | 1.60 | 1.60 | 1.60 | 3.00 | 3.00 | 3.00 | 1.98 |
| | δh [(J/cm³)$^{1/2}$] | 1.14 | 1.14 | 1.14 | 1.14 | 1.14 | 1.14 | 1.14 | 3.514 | 3.514 | 3.514 | 0.191 |
| | HSP of polymer | DH 95% | DH 95% | DH 95% | DH 95% | DH 95% | DH 80% | DH 60% | DH 60% | DH 80% | DH 95% | DH 60% |
| | δd [(J/cm³)$^{1/2}$] | 18.19 | 18.19 | 18.19 | 18.19 | 18.19 | 18.34 | 18.37 | 18.37 | 18.34 | 18.19 | 18.37 |
| | δp [(J/cm³)$^{1/2}$] | 0.38 | 0.38 | 0.38 | 0.38 | 0.38 | 0.29 | 3.55 | 3.55 | 0.29 | 0.38 | 3.55 |
| | δh [(J/cm³)$^{1/2}$] | 2.75 | 2.75 | 2.75 | 2.75 | 2.75 | 2.75 | 3.49 | 3.49 | 2.75 | 2.75 | 3.49 |
| Other properties | | | | | | | | | | | | |
| | M300 [MPa] | 17.6 | 16.9 | 19.6 | 19.1 | 16.9 | 24.1 | 23.2 | 22.6 | 23.7 | 24.1 | 21.3 |
| | TB [MPa] | 35.1 | 34.3 | 56.6 | 34.8 | 35.7 | 33.8 | 28.4 | 29.6 | 34.2 | 39.2 | 33.6 |
| | EB [%] | 468 | 524 | 432 | 465 | 546 | 312 | 287 | 322 | 371 | 446 | 468 |

Ex.: Example
Comp. Ex.: Comparative Example
DH: Degree of hydrogenation

Table 2 shows that the change in tan δ over time was reduced in the examples which contained a copolymer obtained by copolymerizing an aromatic vinyl compound and a conjugated diene compound and which had a heat aging resistance index defined as above of 2.0 or less.

The invention claimed is:

1. A rubber composition, comprising:
at least one copolymer obtained by copolymerizing an aromatic vinyl compound and a conjugated diene compound; and
at least two softeners,
the rubber composition having a heat aging resistance index defined by the following equation (1) of 2.0 or less, Heat aging resistance index=[(tan δ of rubber composition after heat treatment)−(tan δ of rubber composition before heat treatment)]/(tan δ of rubber composition before heat treatment)×100   (1)

wherein each tan δ represents the tan δ at 50° ° C. of the corresponding rubber composition, and the heat treatment involves allowing the rubber composition to stand at a temperature of 90° C. and an oxygen concentration of 20% for 336 hours.

2. The rubber composition according to claim 1, wherein the heat aging resistance index is 1.5 or less.

3. The rubber composition according to claim 1, wherein the heat aging resistance index is 1.0 or less.

4. The rubber composition according to claim 1, wherein the heat aging resistance index is 0.5 or less.

5. The rubber composition according to claim 1, wherein the heat aging resistance index is 0 or less.

6. The rubber composition according to claim 1, wherein
the copolymer is at least one hydrogenated styrene-butadiene rubber having a weight average molecular weight of 200,000 to 2,000,000 and a degree of hydrogenation of 60 mol % or more, and
the rubber composition has an A value of less than 4.5 as calculated from Hansen solubility parameters (HSPs) of the hydrogenated styrene-butadiene rubber and the softener using the following equation (2):

$$A=\sqrt{(\alpha^2+\beta^2+\gamma^2)} \quad (2)$$

wherein α=absolute value of difference between δd of hydrogenated styrene-butadiene rubber and δd of softener,
β=absolute value of difference between δp of hydrogenated styrene-butadiene rubber and δp of softener,
γ=absolute value of difference between δh of hydrogenated styrene-butadiene rubber and δh of softener,
wherein δd: energy from dispersion forces between molecules,
δp: energy from dipolar intermolecular forces between molecules,
δh: energy from hydrogen bonds between molecules.

7. The rubber composition according to claim 1, wherein an amount of at least one styrene-butadiene rubber is 60% by mass or more based on 100% by mass of at least one rubber component in the rubber composition.

8. The rubber composition according to claim 1, wherein the rubber composition comprises, per 100 parts by mass of at least one rubber component therein, 50 parts by mass or more of at least one silica.

9. The rubber composition according to claim 1, wherein the rubber composition comprises, per 100 parts by mass of at least one rubber component therein, 70 parts by mass or less of at least one silica.

10. The rubber composition according to claim 1, wherein the rubber composition comprises, per 100 parts by mass of at least one rubber component therein, 30 parts by mass or more of at least one softener.

11. The rubber composition according to claim 1, wherein an amount of at least one carbon black is 3 parts by mass or less per 100 parts by mass of at least one rubber component in the rubber composition.

12. The rubber composition according to claim 1, wherein the rubber composition is a tread rubber composition.

13. A pneumatic tire, comprising a tire component at least partially comprising the rubber composition according to claim 1.

14. The pneumatic tire according to claim 13, wherein the tire component is a tread.

* * * * *